US009023265B1

(12) United States Patent
Rotter et al.

(10) Patent No.: US 9,023,265 B1
(45) Date of Patent: May 5, 2015

(54) SYSTEMS, TOOLS, AND METHODS FOR FORMING CORRUGATED STRUCTURES AND APPARATUSES INCLUDING CORRUGATED STRUCTURES

(71) Applicant: The Boeing Company, Seal Beach, CA (US)

(72) Inventors: Daniel M. Rotter, Lake Forest Park, WA (US); Brian G. Robins, Renton, WA (US); Kurtis S. Willden, Kent, WA (US); Stephen Lee Metschan, Black Diamond, WA (US); Brad Andrew Coxon, Everett, WA (US); Stephen Keith Kirchmeier, Bothell, WA (US); Joseph D. Anderson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 329 days.

(21) Appl. No.: 13/752,139

(22) Filed: Jan. 28, 2013

(51) Int. Cl.
*B29C 53/22* (2006.01)
*B29C 70/44* (2006.01)
*B29C 53/24* (2006.01)
*B29C 70/54* (2006.01)

(52) U.S. Cl.
CPC .............. *B29C 53/24* (2013.01); *B29C 70/541* (2013.01)

(58) Field of Classification Search
CPC ........ B29C 53/24; B29C 70/541; B29C 33/42
See application file for complete search history.

(56) References Cited

U.S. PATENT DOCUMENTS

| 2,219,805 | A | * | 10/1940 | Buttress .......................... 425/336 |
|---|---|---|---|---|
| 2,350,996 | A | * | 6/1944 | Atkinson et al. ............... 264/137 |
| 2,494,642 | A | * | 1/1950 | Case et al. ...................... 425/370 |
| 3,178,494 | A | * | 4/1965 | Tisdale .......................... 264/505 |
| 3,516,116 | A | * | 6/1970 | Ladyjenski .................... 425/370 |
| 3,540,079 | A | * | 11/1970 | Bush ............................. 425/370 |
| 3,887,320 | A | * | 6/1975 | Erlewine et al. ............... 425/384 |
| 4,492,607 | A | * | 1/1985 | Halcomb ....................... 156/242 |
| 5,015,168 | A | | 5/1991 | Boime et al. |
| 5,139,603 | A | * | 8/1992 | Kunz ............................. 156/470 |
| 5,340,301 | A | * | 8/1994 | Saffire et al. .................. 425/336 |
| 5,593,633 | A | * | 1/1997 | Dull et al. ...................... 264/510 |
| 5,882,462 | A | * | 3/1999 | Donecker et al. ............. 156/205 |
| 6,245,275 | B1 | * | 6/2001 | Holsinger ...................... 264/257 |
| 7,464,508 | B2 | * | 12/2008 | Fournie et al. ............... 52/309.1 |
| 7,959,753 | B2 | | 6/2011 | Nunez Delgado et al. |
| 8,052,826 | B2 | | 11/2011 | Burpo et al. |
| 8,465,613 | B2 | * | 6/2013 | Rotter et al. .................. 156/212 |
| 2004/0265536 | A1 | * | 12/2004 | Sana et al. .................... 428/119 |
| 2006/0231981 | A1 | * | 10/2006 | Lee et al. ...................... 264/320 |
| 2009/0297358 | A1 | * | 12/2009 | Anderson et al. ......... 416/241 A |
| 2009/0320292 | A1 | | 12/2009 | Brennan et al. |
| 2012/0076989 | A1 | * | 3/2012 | Bland ............................ 428/174 |

* cited by examiner

*Primary Examiner* — Matthew Daniels
(74) *Attorney, Agent, or Firm* — DASCENZO Intellectual Property Law, P.C.

(57) ABSTRACT

Tools for forming a corrugated structure from a pliable blank include a plurality of forming blocks that laterally move relative to each other, a compaction mechanism configured to selectively conform the pliable blank to the forming blocks, and a block translating mechanism configured to reconfigure the tool from a pre-formed configuration to a post-formed configuration, in which the forming blocks are positioned closer together than when the tool is in the pre-formed configuration. Associated systems, methods, and apparatuses also are disclosed herein.

18 Claims, 7 Drawing Sheets

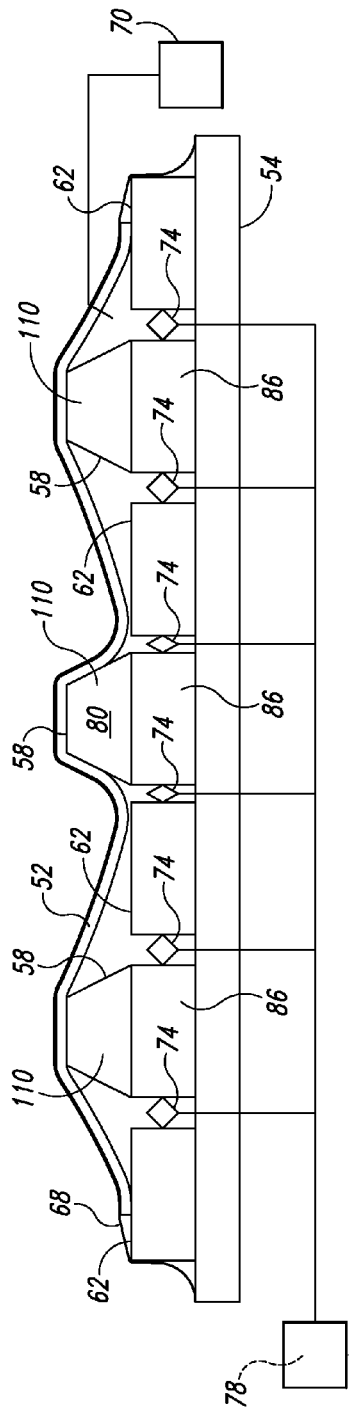
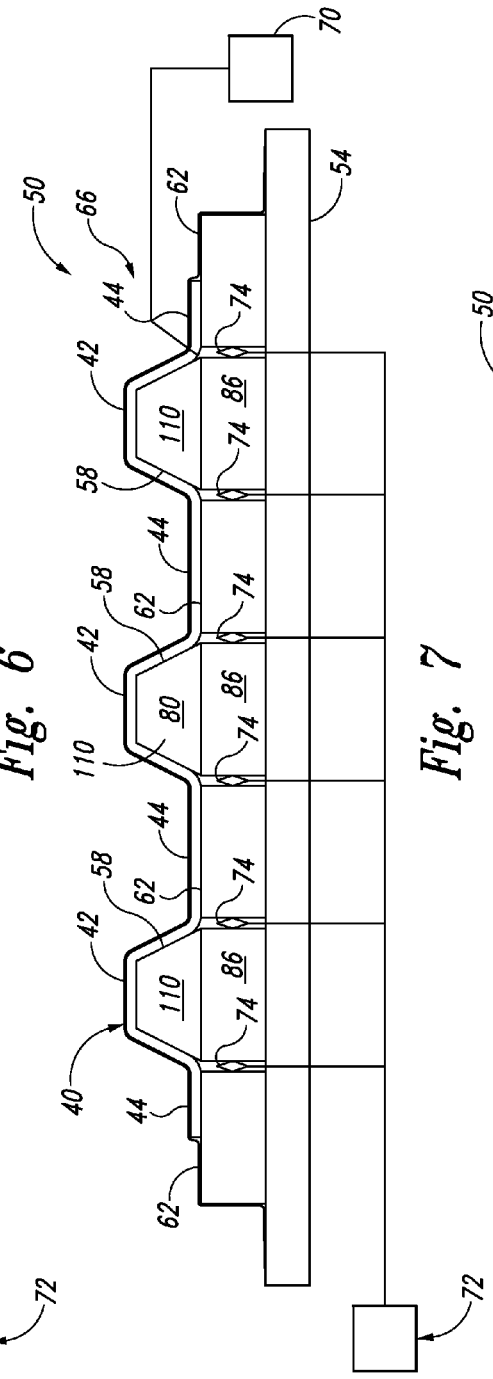
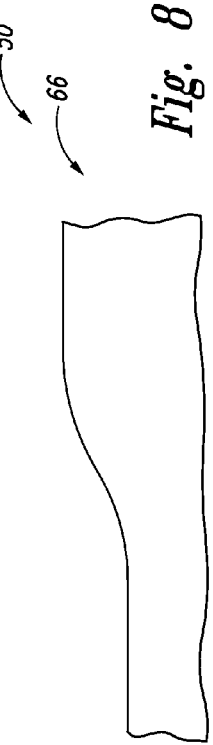
Fig. 6
Fig. 7
Fig. 8

SYSTEMS, TOOLS, AND METHODS FOR FORMING CORRUGATED STRUCTURES AND APPARATUSES INCLUDING CORRUGATED STRUCTURES

FIELD

The present disclosure relates to corrugated structures.

BACKGROUND

Corrugated structures are used for a variety of purposes. For example, roofing material may be constructed of corrugated structures, such as those used to construct greenhouses, patio roofs, etc. In some applications, corrugated structures may be coupled to or may include a skin structure to define a structural assembly that has desired properties and that generally is stronger and/or stiffer than the skin alone. Corrugated cardboard used to construct typical boxes is one example of such a structural assembly. Aerospace structures are also examples of structural assemblies that often include a skin. For example, typical fuselages are constructed of a skin that is coupled to several distinct frame members that extend circumferentially around and that are spaced longitudinally along the inside of the fuselage and several distinct stringers that extend longitudinally along and that are spaced circumferentially around the inside of the fuselage. Recently, aerospace structures, such as fuselages, are being manufactured from fiber reinforced composite materials, such as carbon fiber reinforced polymers. Utilizing known methods of construction, fiber reinforced composite stringers are formed individually and are individually either coupled to the associated skin in an outer mold line layup arrangement or coupled to an inner mold line layup mandrel prior to the associated skin being coupled directly to several individual stringers. Historically, it has not been possible to construct a series of multiple stringers from the same unitary piece of composite material and meet the requisite specifications of the bridging between the body of a stringer and the adjacent flange of a stringer.

SUMMARY

A tool according to the present disclosure for forming a corrugated structure from a pliable blank includes a plurality of forming blocks, a compaction mechanism, and a block translating mechanism. The forming blocks are laterally and movably supported relative to each other. The tool defines a pre-formed configuration and a post-formed configuration. When the tool is in the pre-formed configuration, the forming blocks are spaced laterally further away from each other than when the tool is in the post-formed configuration. When the tool is in the post-formed configuration, the plurality of forming blocks collectively defines a corrugated form. The plurality of forming blocks includes at least one ridge forming block having an upper surface configured to at least partially define a respective ridge of the corrugated structure, and at least two valley forming blocks positioned on opposite lateral sides of the at least one ridge forming block. Each valley forming block has an upper surface that is lower than the upper surface of the at least one ridge forming block and that is configured to at least partially define a respective valley of the corrugated structure. The compaction mechanism is configured to selectively conform the pliable blank to the corrugated form. The block translating mechanism is configured to reconfigure the tool from the pre-formed configuration to the post-formed configuration by selectively translating the at least two valley forming blocks laterally relative to and toward the at least one ridge forming block while the compaction mechanism operatively conforms the pliable blank to the corrugated form.

A system according to the present disclosure for assembling a stiffened composite structure including a corrugated structure includes a tool, a supply of pliable blanks for forming a plurality of corrugated structures with the tool, a layup mandrel for receiving a corrugated structure of the plurality of corrugated structures, and a supply of skin segments for loading onto the layup mandrel over one or more loaded corrugated structures.

A method according to the present disclosure of forming a corrugated structure includes providing a tool; positioning a pliable blank operatively atop the plurality of forming blocks of the tool; following the positioning, translating the at least two valley forming blocks of the tool toward the at least one ridge forming block of the tool; and concurrently with the translating, conforming the pliable blank to the corrugated form of the tool to form the corrugated structure.

Also disclosed are stiffened composite structures and apparatuses constructed at least partially utilizing a tool, a system, and/or a method according to the present disclosure, with illustrative, non-exclusive examples of such stiffened composite structures and apparatuses including (but not being limited to) aircraft, fuselages, fuselage sections, roofing material, etc.

BRIEF DESCRIPTION OF THE DRAWINGS

FIG. 6 is a schematic end view representing a tool and the pliable blank of FIG. 4, with the tool and the pliable blank shown in an intermediate configuration between the pre-formed configuration and the post-formed configuration.

FIG. 7 is a schematic end view representing a tool and the pliable bank of FIG. 4, with the tool and the pliable blank in a post-formed configuration.

FIG. 8 is a fragmentary schematic side view representing an optional compound contour of a forming block of a tool for forming corrugated structures.

DESCRIPTION

Figure 1:
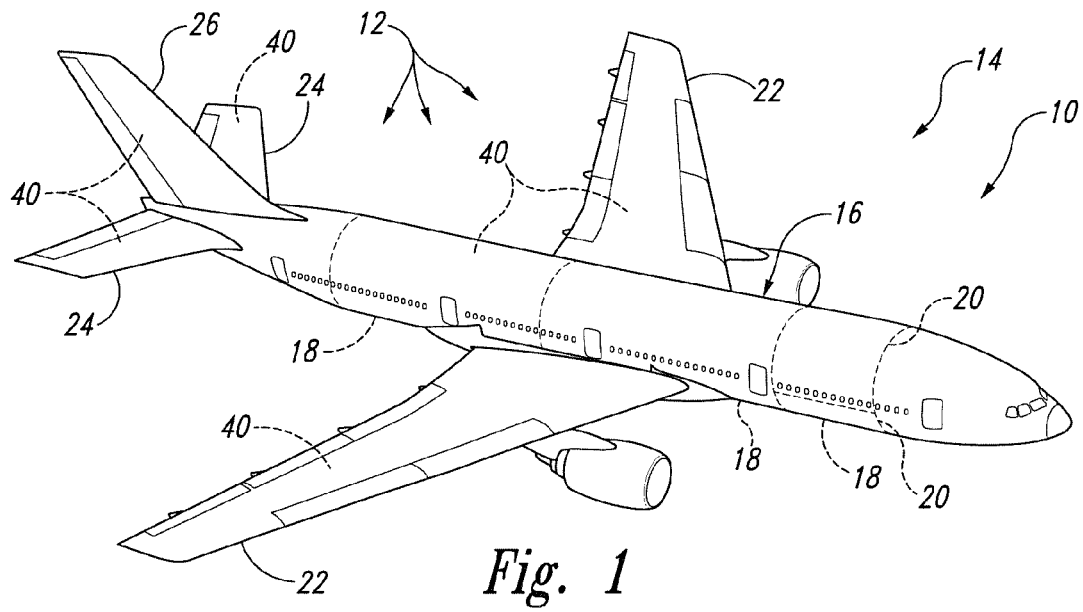
FIG. 1 is a perspective view of an illustrative, non-exclusive example of a stiffened composite structure in the form of an aircraft.

Systems, tools, and methods for forming corrugated structures, as well as apparatuses that include corrugated structures, are disclosed herein. In FIG. 1, an example of an apparatus 10 that may be constructed from stiffened composite structures 12 that include corrugated structures 40 is provided in the form of an aircraft 14; however other apparatuses 10 are within the scope of the present disclosure, and the present disclosure is not limited to aircraft and aircraft applications. For example, as illustrative, non-exclusive examples, other apparatuses 10 that may be include corrugated structures 40 include (but are not limited to) spacecraft, watercraft, land vehicles, wind turbines, structural towers and masts, roofing material, etc. Moreover, aircraft 14 may take any suitable form, including commercial aircraft, military aircraft, private aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) helicopters.

Aircraft 14 include fuselages 16, which generally correspond to the main body of an aircraft 14 for holding passengers, crew, cargo, and/or equipment, for example, depending on the particular configuration and/or function of an aircraft 14. Typically, although not required, the fuselage 16 of an aircraft 14 is elongate and somewhat cylindrical or tubular. In some embodiments, the fuselage 16 may be constructed of multiple sections 18 that are longitudinally spaced along the fuselage 16 and operatively coupled together to define the fuselage 16. As used herein when referencing an aircraft 14, a fuselage 16, a corresponding stiffened composite structure 12, and/or a corresponding corrugated structure 40, the longitudinal direction refers to the fore-aft direction, corresponding to a longitudinal, or long, axis, of the fuselage 16, and/or corresponding to the longitudinal direction of the valleys and ridges that are defined by the corrugated structure 40. Additionally, the terms "inner" and "outer" when used in connection with an aircraft 14, a fuselage 16, and/or a corresponding stiffened composite structure 12 refer to the radially inward side and the radially outward side, respectively, of the corresponding stiffened composite structure. Accordingly, the outer side of a fuselage 16 or a component part thereof generally faces away from the fuselage 16, and the inner side of a fuselage 16 or a component part thereof generally faces the internal volume that is defined by the fuselage 16. Similar relative terms may be used with respect to stiffened composite structures 12 other than fuselages 16 and with respect to apparatuses 10 other than aircraft 14.

In FIG. 1, three fuselage sections 18 are indicated schematically; however, any number or size and shape of sections 18 may be used to construct a fuselage 16. Sections 18 additionally or alternatively may be referred to as barrel sections 18 of a fuselage 16, with each barrel section 18 generally defining a length of the fuselage 16. Additionally or alternatively, as schematically illustrated in FIG. 1, a section 18 may include, or be constructed of, more than one subsection 20. In the schematically illustrated and optional example of FIG. 1, a section 18 is shown schematically and optionally to include an upper subsection 20 and a lower subsection 20; however, a section 18 may be constructed of any suitable number, configuration, and placement of subsections 20, including no subsections 20 at all.

Aircraft 14 also may include wings 22, horizontal stabilizers 24, and a vertical stabilizer 26, each of which may be constructed as a unitary structure or in subsections that are subsequently assembled together. One or more of a fuselage 16, a fuselage section 18, a fuselage subsection 20, a wing 22, a horizontal stabilizer 24, a vertical stabilizer 26, or a structural subsection thereof may be constructed of and/or may be described as a stiffened composite structure 12 according to the present disclosure.

Figure 2:
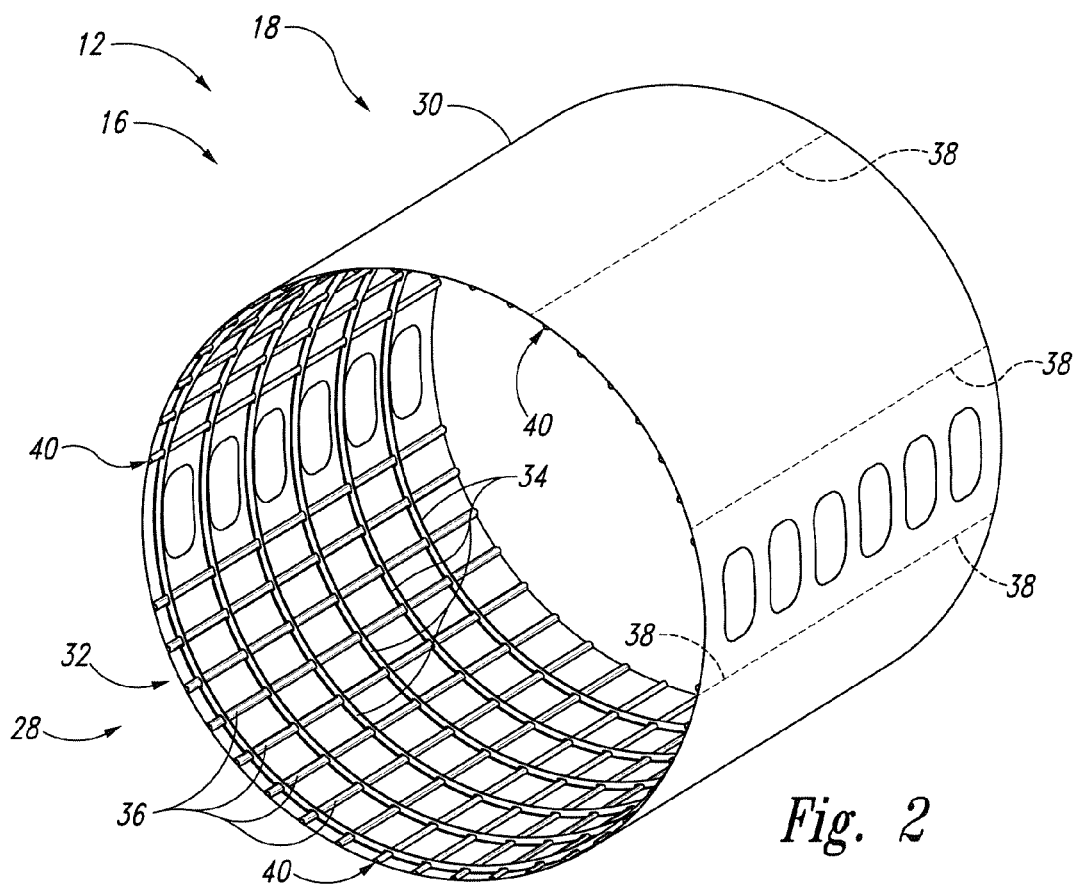
FIG. 2 is an isometric view of an illustrative, non-exclusive example of a stiffened composite structure in the form of a barrel section of an aircraft.

Stiffened composite structures 12 according to the present disclosure generally encompass structures that are defined by a structural frame 28 and a skin 30 that is operatively coupled to and supported by the structural frame 28. FIG. 2 depicts an illustrative, non-exclusive example of a stiffened composite structure 12 in the form of a barrel section 18 of a fuselage 16 of an aircraft 14. The skin 30 may be described as defining the outer shape of the fuselage 16. As indicated in FIG. 2, structural frames 28 include a plurality of stiffeners 32 operatively coupled to the skin 30. In the example of fuselage 16, the stiffeners 32 include a plurality of frame members, or frames, 34 that are operatively coupled to and that extend circumferentially around the inner side of the skin 30 and that are spaced longitudinally along the fuselage 16. The stiffeners 32 also include a plurality of stringers 36 that are defined by one or more corrugated structures 40 that are operatively coupled to the inner side of the skin 30. The stringers 36 extend longitudinally along and are spaced circumferentially around the inner side of the skin 30. In some embodiments, the skin 30 may be constructed of a plurality of skin segments 38 that collectively define the skin 30, or at least a portion of the skin 30 of a stiffened composite structure 12.

Figure 3:
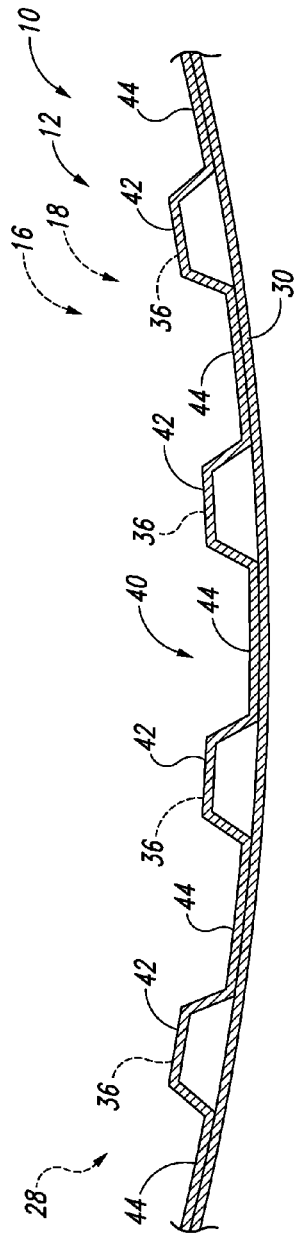
FIG. 3 is a fragmentary cross-sectional view of a portion of a stiffened composite structure that includes a corrugated structure.

FIG. 3 illustrates a portion of an illustrative, non-exclusive example of a composite structure 12 that includes a corrugated structure 40 operatively coupled to a skin 30. For example, the illustrated composite structure 12 of FIG. 3 may represent a portion of a section 18 of a fuselage 16; however, FIG. 3 broadly represents any composite structure 12 or apparatus 10 according to the present disclosure that includes one or more corrugated structures 40. As indicated in FIG. 3, corrugated structures 40 may be described as including, or as defining, alternating ridges 42 and valleys 44. In the optional context of a fuselage 16, the ridges 42 define the stringers 36 of a structural frame 28. Moreover, the stringers may be described as defining a continuous and unitary corrugated structure 40. The use of the terms "ridges" and "valleys" is used for convenience in describing corrugated structures 40 and does not limit the orientation of a respective corrugated structure 40 within a larger composite structure 12 and/or apparatus 10.

Figure 4:
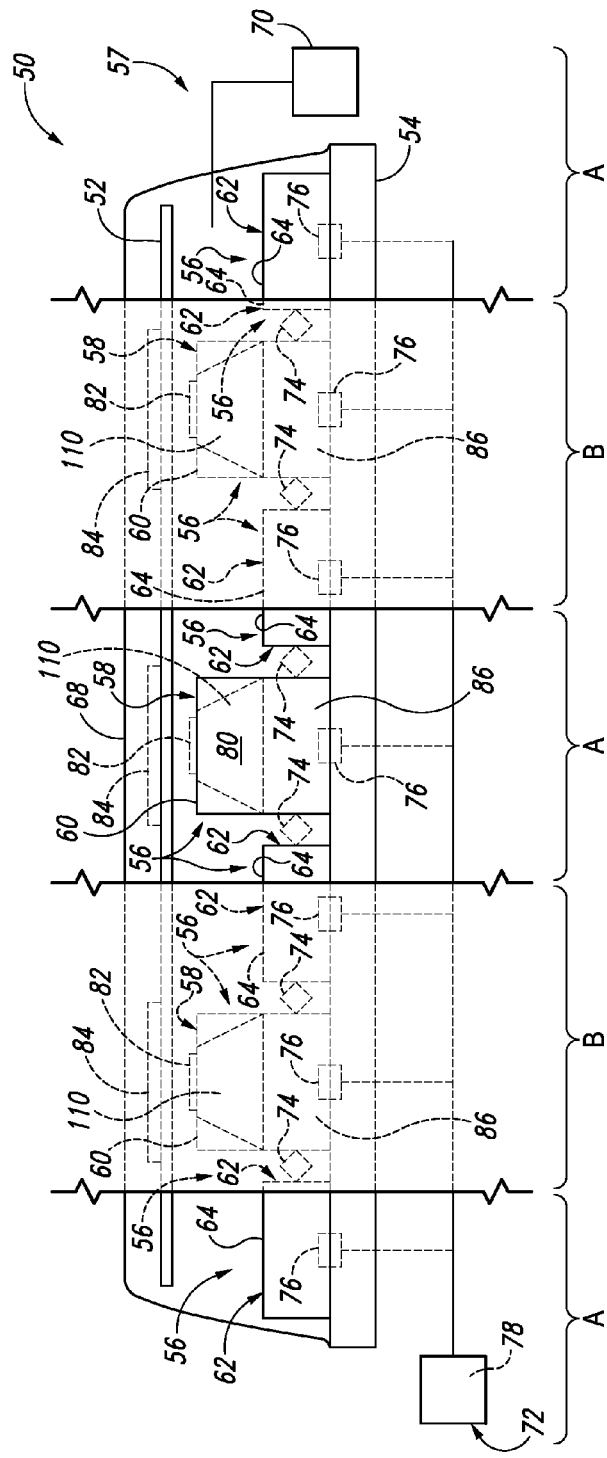
FIG. 4 is a schematic end view representing tools for forming corrugated structures, together with a pliable blank, shown with the tools and the pliable blank in a pre-formed configuration.
Figure 5:
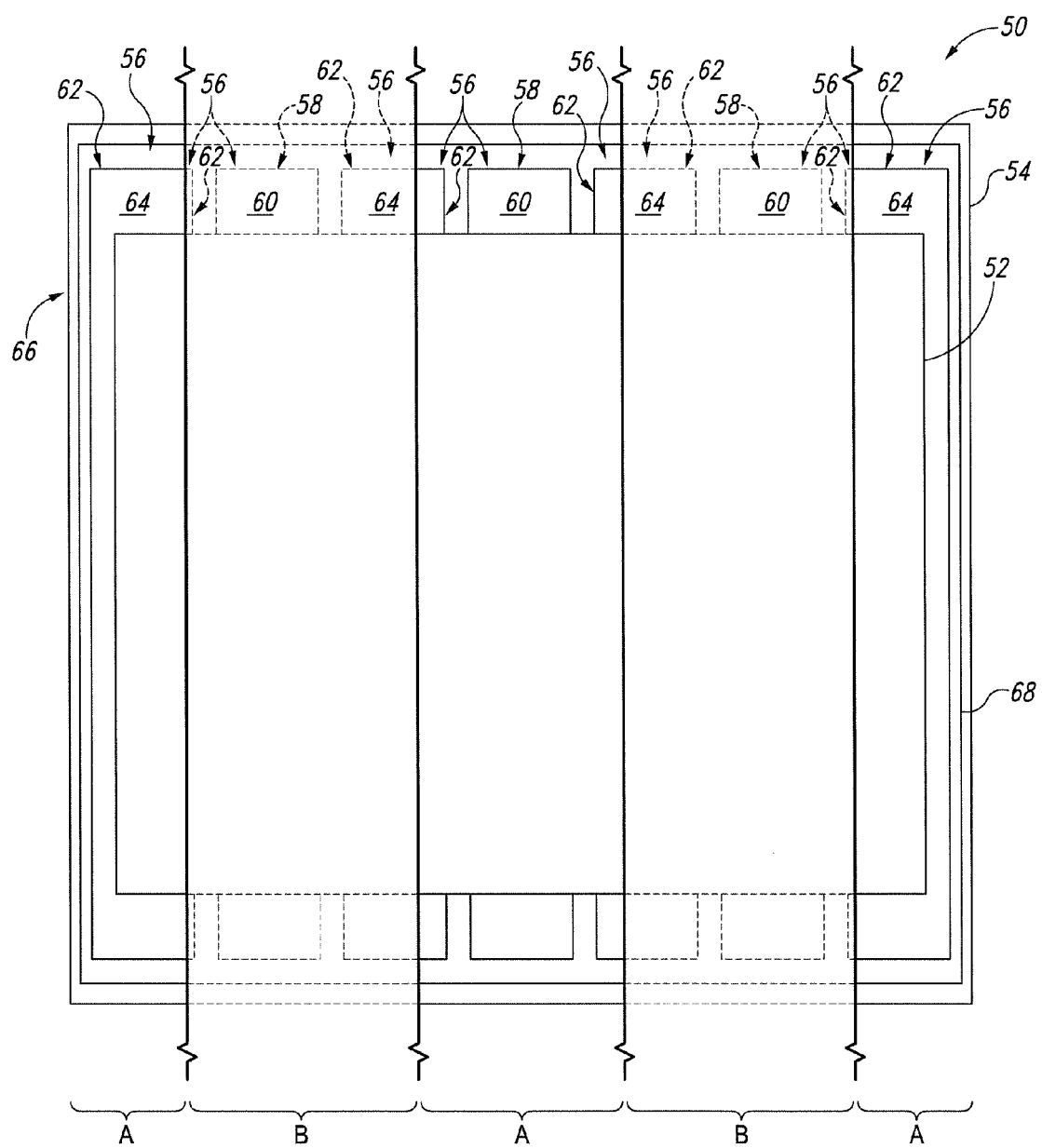
FIG. 5 is a schematic plan view representing the tools and the pliable blank of FIG. 4, with the tools and the pliable blank in a pre-formed configuration.

FIGS. 4-8 schematically represent illustrative examples of tools 50 for forming corrugated structures 40 from a pliable blank 52 of material. FIGS. 4-5 schematically represent various configurations of tools 50, including tools 50 that are configured to form corrugated structures 40 having only a single ridge 42, as well as corrugated structures 40 having any number of suitable ridges 42 and corresponding valleys 44. In FIGS. 4-5, the portions of the drawings indicated at B are optional and any number of these portions may be included in a tool 50 between the portions indicated at A, such as depending on the number of ridges 42 and valleys 44 defined by a corrugated structure 40 that is being formed with a respective tool 50. For ease of discussion and clarity of the drawings, FIGS. 6-7 schematically represent tools 50 that are configured to form corrugated structures 40 having three ridges 42, but FIGS. 6-7 and the accompanying discussions do not limit the scope of the present disclosure to tools 50 that are configured to form corrugated structures having only three ridges 42. As mentioned tools 50 according to the present disclosure appropriately may be configured to form corrugated structures 40 having any desirable number of ridges 42 and valleys 44, including corrugated structures that include only a single ridge 42, as well as corrugated structures that include more than three ridges 42.

As schematically illustrated in FIGS. 4-5, tools 50 include a plurality of forming blocks 56, a compaction mechanism 57, and a block translating mechanism 72.

The plurality of forming blocks 56 are laterally and movably supported relative to each other and in some embodiments may be described as being supported by a base 54. The plurality of forming blocks 56 includes at least one ridge forming block 58 having an upper surface 60 configured to at least partially define a respective ridge 42 of a corrugated structure 40. The plurality of forming blocks 56 also includes at least two valley forming blocks 62 that are positioned on opposite lateral sides of the at least one ridge forming block 58. Each valley forming block 62 has an upper surface 64 that is lower than the upper surface 60 of the at least one ridge forming block 58 and that is configured to at least partially define a respective valley 44 of a corrugated structure 40. Collectively, the plurality of forming blocks 56 defines a corrugated form 66 when the tool 50 is in its post-formed configuration.

In some embodiments, the compaction mechanism 57 includes a gas-impermeable flexible sheet 68 and a vacuum system 70 and may be described as a vacuum compaction mechanism 57; however, other configurations of compaction mechanisms also are within the scope of the present disclosure. When a tool 50 includes a vacuum compaction mechanism 57, the gas-impermeable flexible sheet 68 is configured to be positioned operatively atop a pliable blank 52 when it is positioned operatively atop the plurality of forming blocks 56. The gas-impermeable flexible sheet 68 also is configured to be sealed around a perimeter of the pliable blank 52 when it is positioned operatively atop the plurality of forming blocks 56. The gas-impermeable flexible sheet 68 may be sealed to the base 54 of the tool 50, such as schematically represented in FIGS. 4-5, and/or it may be sealed to the upper surfaces 60, 64 of the forming blocks 56 around the perimeter of a pliable blank 52 that is positioned atop the forming blocks 56.

When provided, the vacuum system 70 is configured to selectively evacuate air from between the gas-impermeable flexible sheet 68 and the forming blocks 56 when the pliable blank 52 is positioned operatively atop of the forming blocks 56, as schematically represented in FIG. 4 with the vacuum system 70 being interconnected with the space between the gas-impermeable flexible sheet 68 and the forming blocks 56. The vacuum system 70 and the gas-impermeable flexible sheet 68 may be described as a "bagging" system. Bagging systems are typically used to compact, or otherwise compress, fiber reinforced composite materials into a desired shape or form, and as discussed herein, pliable blanks 52 may be constructed of fiber reinforced composite material.

The block translating mechanism 72 is configured to selectively translate the valley forming blocks 62 laterally relative to and toward the ridge forming block or blocks 58 while the compaction mechanism 57 operatively conforms a pliable blank 52 to the upper surfaces 60, 64 of the forming blocks 56. Accordingly, a tool 50 may be described as having a pre-formed configuration, such as represented in FIGS. 4-5, and a post-formed configuration, such as represented in FIG. 7, with the forming blocks 56 positioned closer together than when the tool 50 is in the pre-formed configuration. Stated differently, the block translating mechanism 72 may be configured to operatively reconfigure the tool 50 between the post-formed configuration and the pre-formed configuration, in which the forming blocks 56 are spaced laterally further away from each other than when the tool is in the post-formed configuration.

In some embodiments of tools 50, such as that include a vacuum compaction mechanism 57, the compaction mechanism 57 may operatively assist or at least partially cause the forming blocks 56 to laterally translate closer together. For example, the operative evacuation of air from between the gas-impermeable flexible sheet 68 and the forming blocks 56 may cause the forming blocks 56 to draw together.

As seen with reference to FIGS. 4-5 and 7, when the tool 50 is in its pre-formed configuration, the forming blocks 56 are spaced laterally further away from each other than when the tool 50 is in its post-formed configuration. Moreover, when the tool is in its post-formed configuration, forming blocks 56 may be described as defining a corrugated form, or mold, 66.

Block translating mechanisms 72 may take any suitable form and may utilize any suitable process for effectively translating laterally the forming blocks 56 of a tool 50. In FIG. 4, the block translating mechanism 72 is schematically illustrated as being connected to structures 74 positioned operatively between adjacent pairs of forming blocks 56, schematically representing that such structures may expand and contract in width to permit and/or facilitate the lateral translation of the forming blocks 56.

As an illustrative, non-exclusive example, structures 74 may include bladders, and a block translating mechanism 72 may be configured to selectively deflate the bladders to permit the forming blocks 56 to translate toward each other. Similarly, a block translating mechanism 72 may be configured to selectively inflate the bladders to cause the forming blocks 56 to translate away from each other. In some embodiments, the bladders may be air bladders, and the block translating mechanism 72 may include such components as a pump, an air supply, and control valves. Additionally or alternatively, in some embodiments, the bladders may be liquid bladders, and the block translating mechanism 72 may include such components as a pump, a liquid or hydraulic supply, and control valves.

Additionally or alternatively, the structures 74 may include springs that interconnect each adjacent pair of forming blocks 56. In such embodiments, the springs may be configured to selectively compress to permit the forming blocks 56 to translate toward each other when the block translating mechanism 72 operatively reconfigures the tool 50 from the pre-formed configuration to the post-formed configuration. Other types and configurations of structures 74 also are within the scope of the present disclosure.

Additionally or alternatively, as optionally and schematically illustrated in FIG. 4, a block translating mechanism 72 may include structures 76 that interconnect the forming blocks 56 with a base 54, or other supporting structure, in a laterally translational configuration. For example, these structures 76 may include mechanical linkages, such as gears or rack and pinion gear systems. Other examples of mechanical linkages and structures 76 also are within the scope of the present disclosure. Moreover, a tool 50 may include both structures 74 and structures 76 and is not limited to a configuration that includes only one of structures 74 or structures 76.

In some embodiments, the block translating mechanism 72 may include a control system 78 that is configured to sequentially translate select forming blocks 56 in a predetermined order to reconfigure the tool 50 from the pre-formed configuration to the post-formed configuration. For example, the control system 78 may include such illustrative, non-exclusive components as valves, control valves, software, computers, etc. A control system 78, when present, may be manually operated, automatically or computer operated, and/or partially manually operated and partially automatically or computer operated, so as to translate the forming blocks 56 in a desired, or predetermined, sequence relative to each other. For example, in some applications, it may be desirable to selectively and sequentially translate the forming blocks 56 so that when a pliable blank 52 is being conformed to the forming blocks 56, it will conform smoothly to form the corrugated structure 40 without, or with minimal, wrinkles.

In some embodiments, the optional control system 78 may be configured to sequentially translate pairs of opposing forming blocks 56 relative to a central forming block 80. With reference to FIGS. 4-7, a ridge forming block 58 is in the position of a central forming block 80 and alternating pairs of opposing valley forming blocks 62 and opposing ridge forming blocks 58 are increasingly positioned away from the central forming block 80. In such embodiments, the optional control system 78 may be configured to sequentially translate forming blocks 56 toward the central forming block 80 beginning with the pair of opposed forming blocks 56 closest to the central forming block 80 and ending with a pair of opposed forming blocks 56 furthest from the central forming block 80 to reconfigure the tool 50 from the pre-formed configuration to the post-formed configuration. FIG. 6 schematically represents such a tool 50 between the pre-formed configuration of FIG. 4 and the post-formed configuration of FIG. 7, with the closest pair of opposed forming blocks 56 having been initially translated toward the central forming block 80, and with further pairs of opposed forming blocks 56 not yet having been translated toward the central forming block 80. Such a configuration of control system 70 permits air pockets and wrinkles to be urged away from the central forming block 80, so as to be dissipated when the tool 50 reaches its post-formed configuration and thus when a pliable blank 52 has been formed into a corrugated structure 40.

In some embodiments of tools 50, the corrugated form 66 may include contours in only two dimensions, such as corresponding to the corrugation itself. However, it also is within the scope of the present disclosure, that a tool 50 may be configured so that the corrugated form 66 defined by the tool 50 includes contours in three dimensions. FIG. 8 schematically represents a side-profile of such a corrugated form 66, with the corrugated form 66 having a contour in a direction transverse to the corrugation itself. Such a configuration may be desirable for forming corrugated structures 40 having complex contours. As an illustrative, non-exclusive example, sections of a fuselage 16 may have complex contours, such as corresponding to sections adjacent to, or within, the cockpit region, nose region, tail regions, wing region, etc. of the fuselage 16.

The corrugated form 66 may define any suitable corrugated shape having ridges 42 and valleys 44. Accordingly, the forming blocks 56 may have any suitable or desirable shape or contour of upper surfaces 60 and 64. FIG. 4 schematically illustrates forming blocks 56 in solid lines having a rectangular cross-section, schematically representing any suitable or desirable shape of forming blocks 56. FIG. 4 also schematically illustrates in dashed lines, ridge forming blocks 58 having upper surfaces 60 defined by three planar surfaces. Such a configuration may be suitable for forming hat-shaped stringers 36, for example; however, other applications and other shapes of upper surfaces 60 are within the scope of the present disclosure.

As schematically and optionally illustrated in FIG. 4, it is within the scope of the present disclosure that an adhesive 82 may be positioned atop the ridge-forming blocks 58, so that the pliable blank 52 maintains an appropriate position while the block translating mechanism 72 reconfigures the tool 50 from its pre-formed configuration to its post-formed configuration and while the compaction mechanism 57 conforms the pliable blank 52 to the corrugated form 66 to form a corrugated structure 40.

Pliable blanks 52 may be constructed of any suitable material having the desirable properties both for formation of the corrugated structure 40 and for the ultimate application of the corrugated structure 40. As an illustrative, non-exclusive example, pliable blanks 52 may be constructed of fiber reinforced composite material. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers. In some embodiments, the fibers may be woven into a fabric. In some embodiments, the skin 30 and/or the stiffeners 32 may be constructed of multiple layers, or plies, of fiber reinforced composite material. In some such embodiments, the plies may be pre-preg plies, which are layers, or sheets, of fibers that are pre-impregnated with the associated binding material. Accordingly, multiple pre-preg plies may be layered to collectively define a segment of fiber reinforced composite material having desired properties and characteristics. The binding material of pre-preg plies may be partially cured, or pre-cured, so as to permit handling of the plies and selective assembly of the plies. Typically, partially cured pre-preg plies are tacky to the touch and therefore easily stick together when layered, but not necessarily in a permanent fashion. That is, when layered, two adjacent plies may be permitted to translate laterally relative to each other and/or may be able to be separated, if so desired. To more permanently affix adjacent layers of plies together, the layered plies may be compacted, or compressed, together, utilizing any suitable method and at any suitable and various times during the construction of a fiber reinforced composite structure. This compression of two or more layers is referred to as compaction, or as compacting, of the plies.

Pliable blanks 52 used to form a corrugated structure 40 may include a generally uniform layer of material. Additionally or alternatively, depending on the desired properties of the corrugated structure 40 being formed, the pliable blank 52 may not be uniform across its entire span. For example, as schematically and optionally illustrated in FIG. 4, a pliable blank 52 may include thickened regions 84, or regions 84 having more layers of material than adjacent regions. In the optional example schematically represented in FIG. 4, the pliable blank 52 includes thickened regions 84 corresponding to the ridges 42 of the corrugated structure 40 being formed with the pliable blank 52. As an illustrative, non-exclusive example, such a configuration may be desirable for forming stringers 36 for a structural frame 28 of a fuselage 16 of an aircraft 14; however, other applications also are within the scope of the present disclosure.

Figure 9:
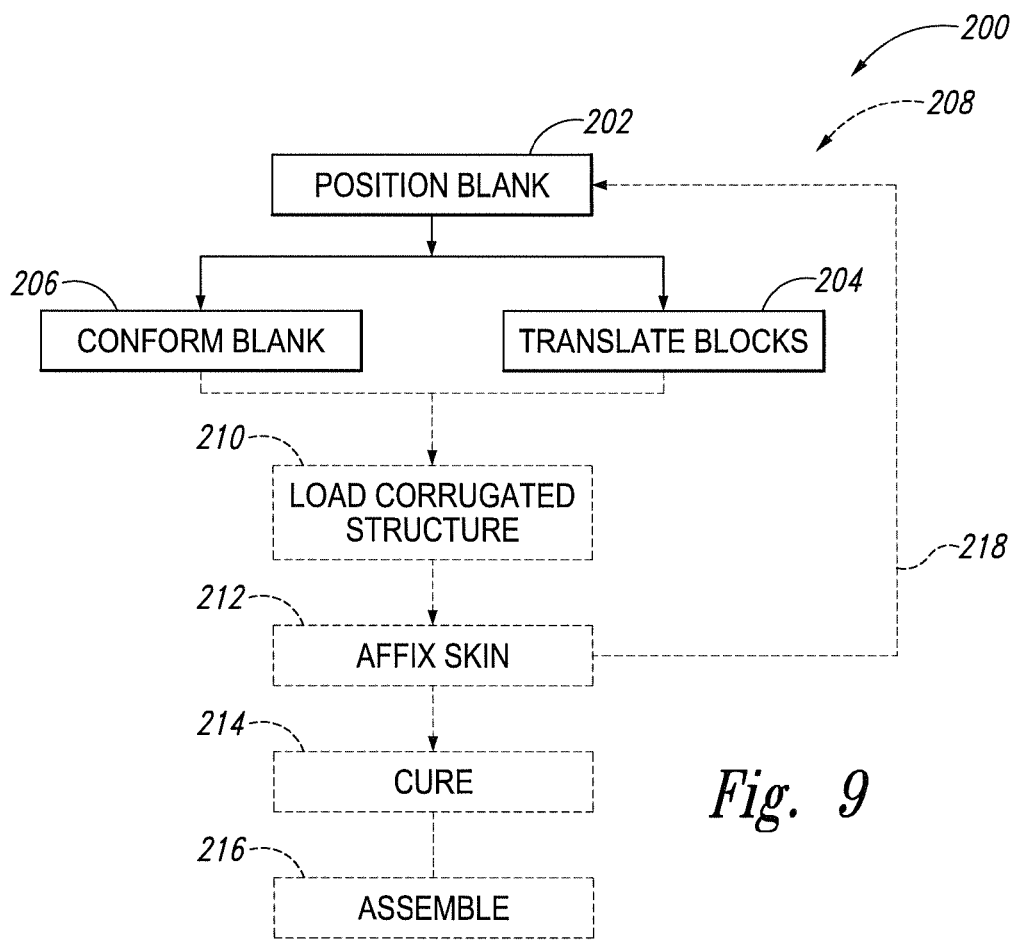
FIG. 9 is a flowchart schematically representing methods of forming corrugated structures and methods of forming stiffened composite structures.

Turning now to FIG. 9, illustrative non-exclusive examples of methods 200 of forming corrugated structures 40 utilizing tools 50 are schematically presented. A method 200 may include positioning a pliable blank 52 operatively atop the plurality of forming blocks 56 of a tool 50, as indicated in FIG. 9 at 202, followed by translating the at least two valley forming blocks 62 of the tool 50 toward the at least one ridge forming block 58 of the tool 50, as indicated at 204. Concurrently with the translating 204, the pliable blank 52 may be conformed to the corrugated form 66 of the tool 50 to form the corrugated structure 40, as indicated at 206.

With embodiments of tools 50 that include a vacuum compaction mechanism 57, following the positioning 202 and prior to the translating 204 and conforming 206, a method 200 may include sealing a gas-impermeable flexible sheet 68 around a perimeter of the pliable blank 52. In such methods 200, the conforming 206 may include applying a vacuum between the gas-impermeable flexible sheet 68 and the plurality of forming blocks 56 to suction the pliable blank 52 to the plurality of forming blocks 56.

Additionally or alternatively, in some methods 200, the translating 204 may include sequentially translating select forming blocks 56 in a predetermined order to reconfigure the tool 50 from its pre-formed configuration to its post-formed configuration and to form the corrugated structure 40.

Additionally or alternatively, with embodiments of tools 50 that include a central forming block 80, the translating 204 may include sequentially translating pairs of forming blocks 56 beginning with a pair of forming blocks 56 closest to the central forming block 80 and ending with a pair of forming blocks 56 furthest from the central forming block 80 to reconfigure the tool 50 from its pre-formed configuration to its post-formed configuration.

Additionally or alternatively, the translating 204 may include sequentially translating select forming blocks 56, such as to smoothly form the corrugated structure 40 without wrinkles.

Figure 10:
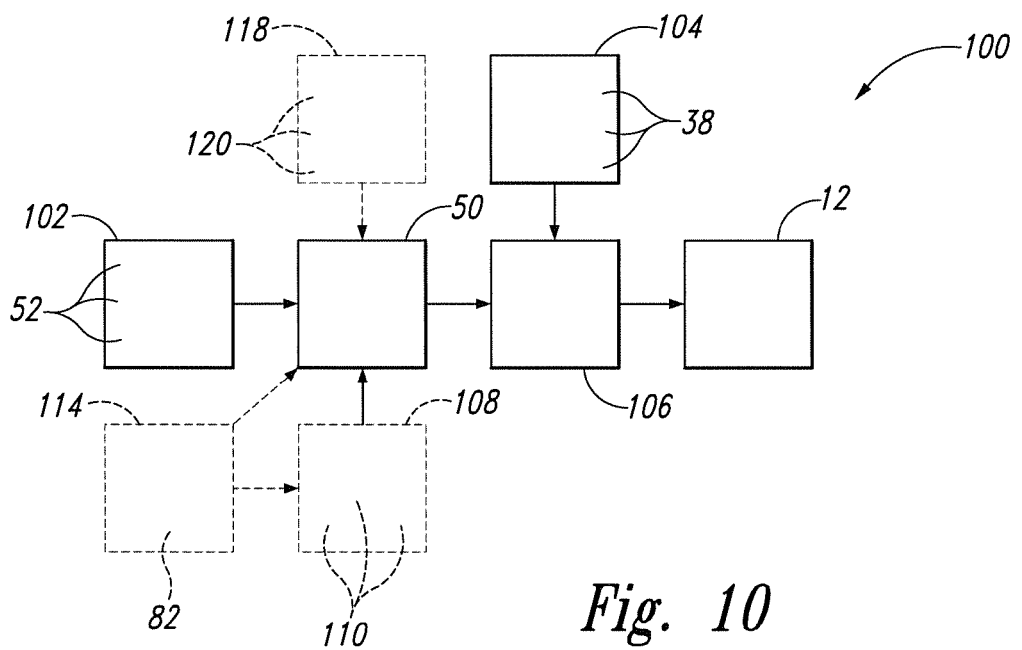
FIG. 10 is a schematic diagram representing systems for assembling stiffened composite structures that include corrugated structures.
Figure 11:
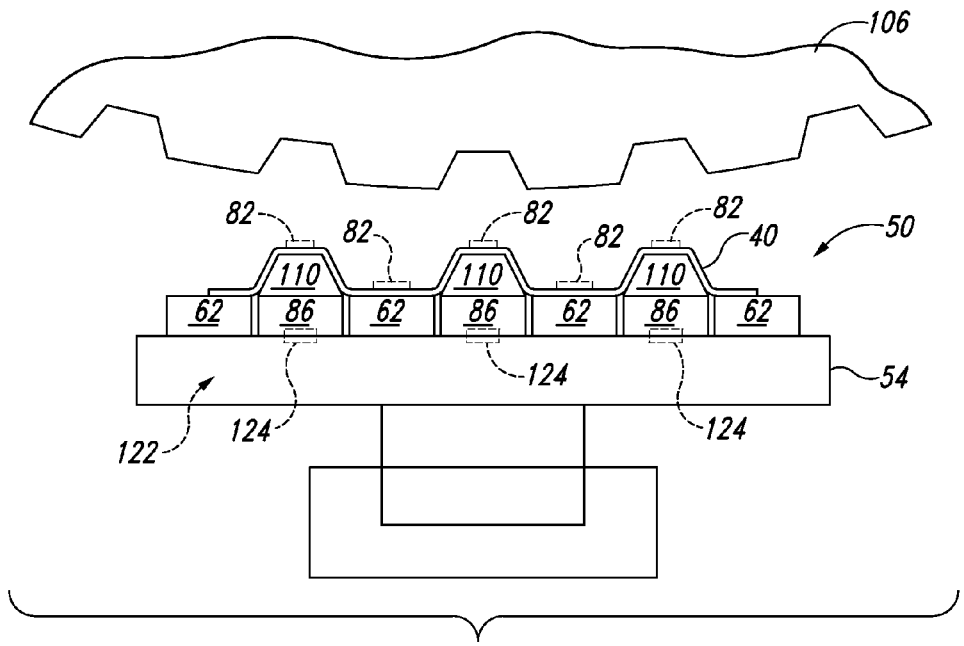
FIG. 11 is a schematic end view representing a combined tool for forming corrugated structures and for loading a corrugated structure on an inner mold line layup mandrel, together with an inner mold line layup mandrel.
Figure 12:
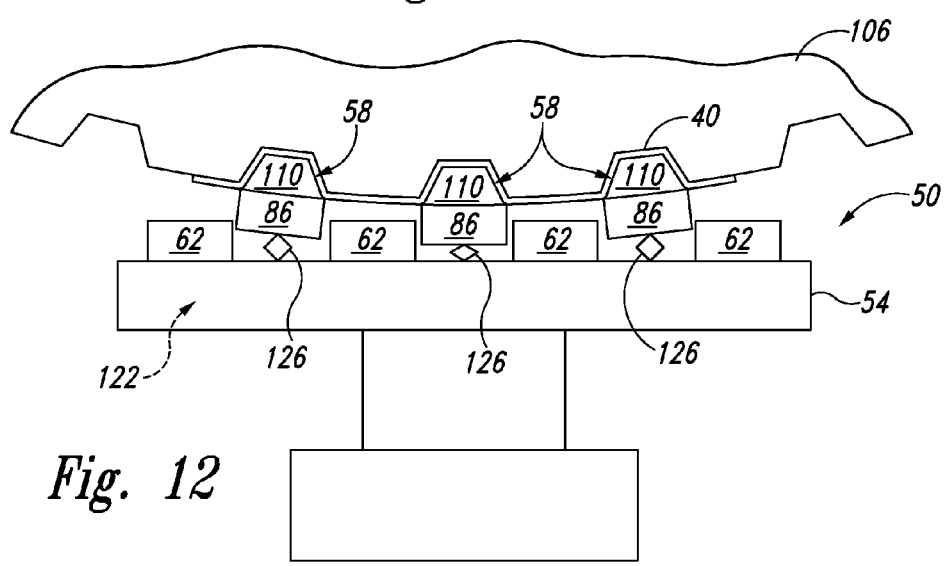
FIG. 12 is a schematic end view of the tool of FIG. 11, showing the tool operatively loading a corrugated structure on the inner mold line layup mandrel.
Figure 13:
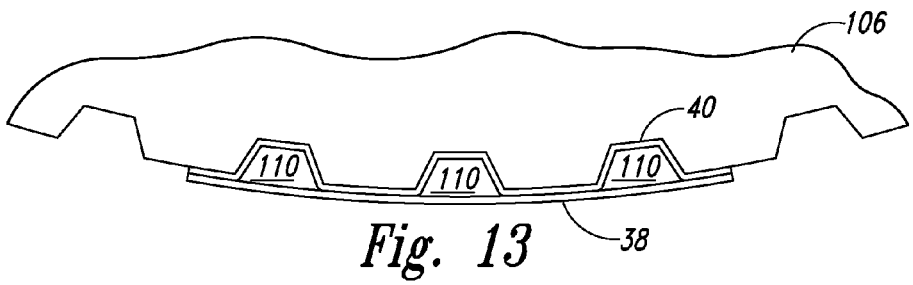
FIG. 13 is a schematic end view of an inner mold line layup mandrel with a corrugated structure and a skin segment loaded thereon.

FIG. 9 also schematically represents illustrative, non-exclusive examples of methods 208 of forming, or assembling, a composite structure 12, and FIG. 10 provides a schematic representation of illustrative, non-exclusive examples of systems 100 for assembling composite structures 12 that include corrugated structures 40. FIGS. 11-13 provide somewhat less schematic but still non-exclusive examples of component parts of systems 100, such as that perform and/or are utilized in connection with the performance of one or more steps of methods 208. The schematic representation of tools 50 of FIGS. 4-8 also represent examples of component parts of systems 100; however, a tool 50 according to the present disclosure is not required to be utilized with a system 100 or with a method 208 according to the present disclosure, and systems 100 and methods 208 represent only non-exclusive examples of applications of tools 50. FIG. 10 additionally or alternatively may be described as schematically representing, or illustrating, the flow of materials through a manufacturing facility, with the flow of materials ultimately resulting in a stiffened composite structure 12, and optionally resulting in a fully assembled apparatus 10. In FIGS. 4-13, some elements are illustrated in dashed lines, schematically representing that such elements may be optional or may correspond to an optional version of a tool 50, a system 100, and/or a method 208. That said, not all tools 50, systems 100, and methods 208 are required to include the elements illustrated in solid lines. The schematic representation of tools 50, systems 100, and methods 208 in FIGS. 4-13 are not limiting and other tools 50, systems 100, component parts of tools 50, systems 100, methods 208, and steps of methods 208 are within the scope of the present disclosure, including tools 50 systems 100, and methods 208 having greater than or fewer than the number of illustrated elements.

With reference to FIG. 10, a system 100 may include a tool 50, a supply 102 of pliable blanks 52 for forming a plurality of corrugated structures 40 with the tool 50, a layup mandrel 106 for receiving corrugated structures 40, and a supply 104 of skin segments 38 for loading onto the layup mandrel 106 over one or more loaded corrugated structures 40. Additionally, in some embodiments, a system 100 further may include a supply 108 of filler structures 110, a supply 114 of adhesive 82, and/or a supply 118 of radius fillers, or noodles, 120.

As schematically represented in FIG. 9, following the translating 204 and the conforming 206, a method 208 may include loading the corrugated structure 40 onto a layup mandrel 106, as indicated at 210. Then, following the loading 210, a method 208 may include affixing a skin segment 38 over the corrugated structure 40 on the layup mandrel 106 to form at least a portion of a stiffened composite structure 12, as indicated at 212, and as schematically illustrated in FIG. 13. Some methods 208 further may include curing the portion of stiffened composite structure 12, as indicated at 214, and assembling a plurality of formed portions of stiffened composite structures 12 to produce a stiffened composite structure 12, as indicated at 216. Accordingly, in some methods 208, the positioning 202, the translating 204, the conforming 206, the loading 210, and the affixing 212 may be repeated, as indicated at 218 to form multiple portions of stiffened composite structures 12 or multiple stiffened composite structures 12.

To perform the loading 210, it is within the scope of the present disclosure that a tool 50 is configured to be positioned adjacent the layup mandrel 106 and to operatively load the corrugated structure 40 onto the layup mandrel. FIGS. 11-12 schematically illustrate such a tool 50 together with a layup mandrel 106 in the form of an inner mold line layup mandrel; however, it is within the scope of the present disclosure that outer mold line layup mandrels also may be used and incorporated into a system 100. In FIG. 11, the tool 50 is operatively positioned underneath the layup mandrel 106 for operatively loading the corrugated structure 40 onto the underside of the layup mandrel 106, but it also is within the scope of the present disclosure that tools 50 be configured to load corrugated structures 40 from any orientation relative the layup mandrel 106.

To load a corrugated structure 40 onto a layup mandrel 106, adhesive 82 may be applied to the side of the corrugated structure that will be engaged with the layup mandrel 106, as schematically illustrated in FIG. 11 with adhesive 82 being applied to both the ridges 42 and the valleys 44 of the corrugated structure 40. As an illustrative, non-exclusive example, the adhesive 82 may be in the form of adhesive strips; however, other configurations of optional adhesive 82 also are within the scope of the present disclosure.

To perform the loading 210, such a tool 50 may include a loading system 122 having mechanisms 124 that are configured to selectively and operatively lift, or otherwise translate, at least the ridge forming blocks 58 toward the layup mandrel 106. As an illustrative, non-exclusive example, and as schematically represented in FIG. 12, the mechanisms 124 may include bladders 126 that may be selectively inflated to operatively translate the ridge forming blocks 58 toward the layup mandrel 106. Similar to the optional structures 74, the bladders 126 may be air bladders or liquid bladders, and the loading system 122 may include such component parts as a pump, an air supply, a liquid or hydraulic supply, control valves, etc. While FIG. 12 schematically represents a tool 50 in which only the ridge forming blocks 58 are operatively translated toward the layup mandrel 106, it is within the scope of the present disclosure that the valley forming blocks 62 also be translated toward the layup mandrel 106 by a loading system 122.

As mentioned, some systems 100 include a supply 108 of filler structures 110. Filler structures 110 are structures that may be positioned within cavities defined by the ridges 42 and valleys 44 of a corrugated structure 40, so that when a skin segment 38 is operatively affixed to the corrugated structure 40, the filler structures 110 provide structure for receiving a compaction force and for defining the shape of the skin segment 38 at the region of the cavities. In the aerospace industry, filler structures 110 may be referred to as stringer mandrels, stringer cure mandrels, stringer bladders, or stringer cure bladders. In addition to the filler structures 110, radius fillers, or noodles, 120 often are used at the interfaces between the outer most edges of the filler structures 110 and the stringers 36 to ensure a smooth transition between the outer surfaces of the filler structures 110 and the structure defining the stringers 36 to which the skin segment 38 will be affixed. Accordingly, a system 100 may include a supply 118 of noodles 120.

With reference back to FIGS. 4 and 6-7, each ridge forming block 58 of a tool 50 may include a filler structure 110 that is configured to be removably engaged to an upper side of a base block 86. That is, at least temporarily during the process of forming a corrugated structure 40, a filler structure 110 may define a portion of a ridge forming block 58. Moreover, the filler structures 110 may be configured to be selectively disengaged from the upper side of base blocks 86 and to remain with the corrugated structure 40 after the tool 50 has operatively loaded the corrugated structure 40 onto the layup mandrel 106, and to be captured by a skin segment 38 loaded onto the layup mandrel 106, as schematically illustrated in FIG. 13.

In some such methods 208, the loading 210 therefore may include disengaging the base block 86 from the filler structure 110 so that the filler structure 110 is operatively loaded on the layup mandrel 106 with the corrugated structure 40, and the affixing 212 may include includes affixing the skin segment 38 over the filler structure 110. This process is schematically represented by the sequence of FIGS. 11-13. Illustrative, non-exclusive examples of affixing 212 skin segments 38 are disclosed in U.S. patent application Ser. No. 13/693,887, filed on Dec. 4, 2012 and entitled SYSTEMS AND METHODS FOR ASSEMBLING A SKIN OF A COMPOSITE STRUCTURE, the complete disclosure of which is incorporated herein by reference.

Figure 14:
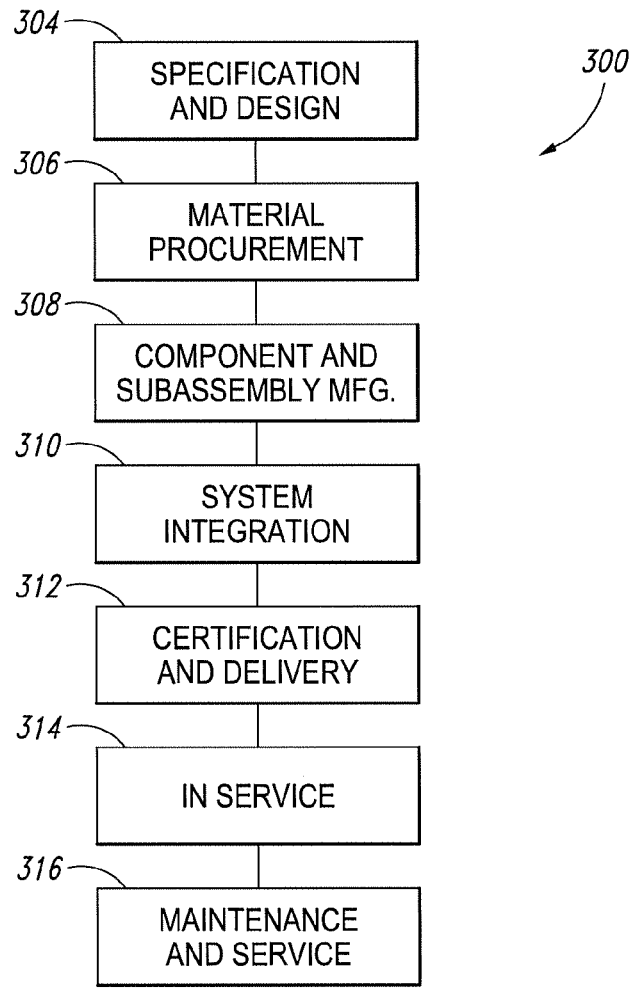
FIG. 14 is a flowchart schematically representing aircraft production and service methodology.
Figure 15:
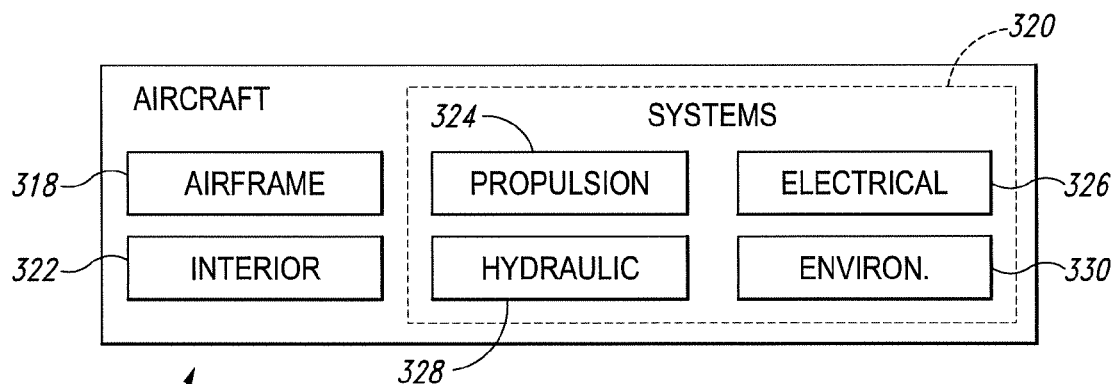
FIG. 15 is a block diagram schematically representing an aircraft.

Turning now to FIGS. 14-15, embodiments of the present disclosure may be described in the context of an aircraft manufacturing and service method 300 as shown in FIG. 14 and an aircraft 14 as shown in FIG. 15. During pre-production, exemplary method 300 may include specification and design 304 of the aircraft 14 and material procurement 306. During production, component and subassembly manufacturing 308 and system integration 310 of the aircraft 14 takes place. Thereafter, the aircraft 14 may go through certification and delivery 312 in order to be placed in service 314. While in service by a customer, the aircraft 14 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 14 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 300. For example, components or subassemblies corresponding to production process 308 may be fabricated or manufactured in a manner similar to components or subassemblies produced while the aircraft 14 is in service. Also, one or more apparatus embodiments, method embodiments, or a combination thereof may be utilized during the production stages 308 and 310, for example, by substantially expediting assembly of or reducing the cost of an aircraft 14. Similarly, one or more of apparatus embodiments, method embodiments, or a combination thereof may be utilized while the aircraft 14 is in service, for example and without limitation, during maintenance and service 316.

Illustrative, non-exclusive examples of inventive subject matter according to the present disclosure are described in the following enumerated paragraphs:

A. A tool for forming a corrugated structure from a pliable blank, the tool comprising:

a plurality of forming blocks laterally and movably supported relative to each other; wherein the tool defines a pre-formed configuration and a post-formed configuration; wherein when the tool is in the pre-formed configuration, the forming blocks are spaced laterally further away from each other than when the tool is in the post-formed configuration; wherein when the tool is in the post-formed configuration, the plurality of forming blocks collectively defines a corrugated form; and wherein the plurality of forming blocks includes:

at least one ridge forming block having an upper surface configured to at least partially define a respective ridge of the corrugated structure; and at least two valley forming blocks positioned on opposite lateral sides of the at least one ridge forming block, wherein each valley forming block has an upper surface that is lower than the upper surface of the at least one ridge forming block and that is configured to at least partially define a respective valley of the corrugated structure;

a compaction mechanism configured to selectively conform the pliable blank to the corrugated form; and a block translating mechanism configured to reconfigure the tool from the pre-formed configuration to the post-formed configuration by selectively translating the at least two valley forming blocks laterally relative to and toward the at least one ridge forming block while the compaction mechanism operatively conforms the pliable blank to the corrugated form.

A1. The tool of paragraph A, wherein the plurality of forming blocks includes a plurality of ridge forming blocks and a plurality of valley forming blocks laterally supported in an alternating arrangement.

A2. The tool of any of paragraphs A-A1, wherein the compaction mechanism includes:

a gas-impermeable flexible sheet configured to be positioned operatively atop the pliable blank when the pliable blank is positioned operatively atop the plurality of forming blocks, wherein the gas-impermeable flexible sheet is configured to be sealed around a perimeter of the pliable blank when the pliable blank is positioned operatively atop the plurality of forming blocks; and a vacuum system configured to selectively evacuate air from between the gas-impermeable flexible sheet and the plurality of forming blocks when the pliable blank is positioned operatively atop of the plurality of forming blocks to conform the pliable blank to the corrugated form.

A3. The tool of any of paragraphs A-A2, wherein the block translating mechanism includes a bladder positioned between each adjacent pair of forming blocks of the plurality of forming blocks, and wherein the block translating mechanism is configured to selectively deflate the bladders to cause the forming blocks to translate toward each other when the block translating mechanism reconfigures the tool from the pre-formed configuration to the post-formed configuration.

A4. The tool of any of paragraphs A-A3, further comprising:

wherein the block translating mechanism includes mechanical linkages configured to operatively translate the forming blocks when the tool is reconfigured from the pre-formed configuration to the post-formed configuration, optionally wherein the mechanical linkage includes gears, and optionally wherein the mechanical linkage includes a rack and pinion gear system.

A5. The tool of any of paragraphs A-A4, wherein the block translating mechanism includes a spring interconnecting each adjacent pair of forming blocks of the plurality of forming blocks, and wherein the springs are configured to selectively compress to permit the forming blocks to translate toward each other when the block translating mechanism operatively reconfigures the tool from the pre-formed configuration to the post-formed configuration.

A6. The tool of any of paragraphs A-A5, wherein the block translating mechanism includes a control system configured to sequentially translate select forming blocks of the plurality of forming blocks in a predetermined order to reconfigure the tool from the pre-formed configuration to the post-formed configuration.

A6.1. The tool of paragraph A6 when depending from paragraph A1, wherein the plurality of forming blocks includes a central forming block (optionally a central ridge forming block), and wherein the controller is configured to sequentially translate pairs of forming blocks toward the central forming block beginning with a pair of forming blocks closest to the central forming block and ending with a pair of forming blocks furthest from the central forming block to reconfigure the tool from the pre-formed configuration to the post-formed configuration.

A6.2. The tool of any of paragraphs A6-A6.1, wherein the control system is configured to sequentially translate select forming blocks of the plurality of forming blocks in a predetermined order to reconfigure the tool from the pre-formed configuration to the post-formed configuration, optionally so as to smoothly form the corrugated structure without wrinkles.

A7. The tool of any of paragraphs A-A6.2, wherein the corrugated form includes contours in two dimensions.

A8. The tool of any of paragraphs A-A6.2, wherein the corrugated form includes contours in three dimensions.

A9. The tool of any of paragraphs A-A8, wherein the tool is configured to be positioned adjacent a layup mandrel, optionally an inner mold line layup mandrel and optionally an outer mold line layup mandrel, and to operatively load the corrugated structure onto the layup mandrel.

A9.1. The tool of paragraph A9, wherein the at least one ridge forming block includes a base block and a filler structure removably engaged to an upper side of the base block, wherein the filler structure is configured to be selectively disengaged from the upper side of the base block and to remain with the corrugated structure after the tool has operatively loaded the corrugated structure onto the layup mandrel.

A9.1.1. The tool of paragraph A9.1, wherein the filler structure is configured to be captured between the corrugated structure and a skin segment while the corrugated structure is operatively loaded on the layup mandrel.

B. A system for assembling a stiffened composite structure including a corrugated structure, the system comprising:

the tool of any of paragraphs A-A9.1.1;

a supply of pliable blanks for forming a plurality of corrugated structures with the tool;

a layup mandrel for receiving a corrugated structure of the plurality of corrugated structures; and a supply of skin segments for loading onto the layup mandrel over one or more loaded corrugated structures.

B1. The system of paragraph B when depending from any of paragraphs A9.1-A9.1.1, further comprising:

a supply of filler structures, wherein each filler structure is configured to be removably engaged to an upper side of the base block, to be selectively disengaged from the upper side of the base block, to remain with the corrugated structure after the tool has operatively loaded the corrugated structure onto the layup mandrel, and to be captured by a skin segment loaded onto the layup mandrel.

B2. The system of any of paragraphs B-B1, wherein the pliable blanks are constructed of fiber reinforced composite material, and optionally of pre-preg composite plies.

B3. The system of any of paragraphs B-B2, wherein the skin segments are constructed of fiber reinforced composite material, and optionally of pre-preg composite plies.

C. A method of forming a corrugated structure, the method comprising:

providing the tool of any of paragraphs A-A9.1.1;

positioning a pliable blank operatively atop the plurality of forming blocks;

following the positioning, translating the at least two valley forming blocks toward the at least one ridge forming block; and concurrently with the translating, conforming the pliable blank to the corrugated form to form the corrugated structure.

C1. The method of paragraph C, further comprising:

following the positioning and prior to the translating and conforming, sealing a gas-impermeable flexible sheet around a perimeter of the pliable blank;

wherein the conforming includes applying a vacuum between the gas-impermeable flexible sheet and the plurality of forming blocks to suction the pliable blank to the plurality of forming blocks.

C2. The method of any of paragraphs C-C1, wherein the translating includes sequentially translating select forming blocks of the plurality of forming blocks in a predetermined order to reconfigure the tool from the pre-formed configuration to the post-formed configuration and to form the corrugated structure.

C3. The method of any of paragraphs C-C2, wherein the plurality of forming blocks includes a central forming block (optionally a central ridge forming block), and wherein the translating includes sequentially translating pairs of forming blocks beginning with a pair of forming blocks closest to the central forming block and ending with a pair of forming blocks furthest from the central forming block to reconfigure the tool from the pre-formed configuration to the post-formed configuration.

C4. The method of any of paragraphs C-C3, wherein the translating includes sequentially translating select forming blocks of the plurality of forming blocks, optionally so as to smoothly form the corrugated structure without wrinkles.

C5. The method of any of paragraphs C-C4, further comprising:

following the conforming, loading the corrugated structure onto a layup mandrel; and following the loading, affixing a skin segment over the corrugated structure on the layup mandrel to form at least a portion of a stiffened composite structure.

C5.1. The method of paragraph C5 when depending from paragraph A9.1, wherein the loading includes disengaging the base block from the filler structure so that the filler structure is operatively loaded on the layup mandrel with the corrugated structure; and wherein the affixing includes affixing the skin segment over the filler structure.

C5.2. The method of any of paragraphs C5-C5.1, wherein the affixing includes any suitable method disclosed in U.S. patent application Ser. No. 13/693,887.

C5.3. The method of any of paragraphs C5-C5.2, further comprising:

following the affixing, curing the at least a portion of the stiffened composite structure.

C5.4. The method of any of paragraphs C5-C5.3, further comprising:

repeating the positioning, the translating, the conforming, the loading, and the affixing to form another, and optionally a greater, portion of the stiffened composite structure.

C5.4.1. The method of paragraph C5.4, further comprising:

following the repeating, assembling a plurality of formed portions of the stiffened composite structure to produce the stiffened composite structure.

C5.5. The method of any of paragraphs C5-C5.4.1, wherein the stiffened composite structure includes one of a barrel section of an aircraft fuselage, an aircraft fuselage, a wing section of an aircraft, a wing of an aircraft, a stabilizer section of an aircraft, a stabilizer of an aircraft, a structural section of an aircraft, and an aircraft.

C6. The method of any of paragraphs C-C5.5, wherein the pliable blank is constructed of fiber reinforced composite material, and optionally of pre-preg composite plies.

C7. The method of any of paragraphs C-C6, wherein the method utilizes the system of any of paragraphs B-B3.

D. An apparatus constructed utilizing the tool of any of paragraphs A-A9.1.1, the system of any of paragraphs B-B3, and/or the method of any of paragraphs C-C7.

E. An aircraft, comprising:

a fuselage, wherein the fuselage is constructed of a stiffened composite structure, wherein the stiffened composite structure includes:

a skin; and a plurality of stringers that are operatively coupled to and that extend longitudinally along an inner side of the skin and that are spaced circumferentially around the fuselage, wherein at least a subset of the stringers that includes two or more stringers is defined by a continuous and unitary corrugated structure that is constructed of fiber reinforced composite material.

E1. The aircraft of paragraph E, wherein the continuous and unitary corrugated structure was constructed utilizing the tool of any of paragraphs A-A9.1.1, the system of any of paragraphs B-B3, and/or the method of any of paragraphs C-C7.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present application, and the term or terms as used in an incorporated patent document shall only control with respect to the document in which the term or terms are defined.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A tool for forming a corrugated structure from a pliable blank, the tool comprising:

a plurality of forming blocks laterally and movably supported relative to each other; wherein the tool defines a pre-formed configuration and a post-formed configuration; wherein when the tool is in the pre-formed configuration, the forming blocks are spaced laterally further away from each other than when the tool is in the post-formed configuration; wherein when the tool is in the post-formed configuration, the plurality of forming blocks collectively defines a corrugated form; and wherein the plurality of forming blocks includes:

at least one ridge forming block having an upper surface configured to at least partially define a respective ridge of the corrugated structure; and at least two valley forming blocks separate from the at least one ridge forming block positioned on opposite lateral sides of the at least one ridge forming block, wherein each valley forming block has an upper surface that is lower than the upper surface of the at least one ridge forming block and that is configured to at least partially define a respective valley of the corrugated structure;
a compaction mechanism configured to selectively conform the pliable blank to the corrugated form; and
block translating mechanisms positioned between each of the at least two valley forming blocks and the at least one ridge forming block configured to reconfigure the tool from the pre-formed configuration to the post-formed configuration by selectively translating the at least two valley forming blocks laterally relative to and toward the at least one ridge forming block while the compaction mechanism operatively conforms the pliable blank to the corrugated form.

2. The tool of claim 1, wherein the plurality of forming blocks includes a plurality of ridge forming blocks and a plurality of valley forming blocks laterally supported in an alternating arrangement.

3. The tool of claim 1, wherein the compaction mechanism includes:
a gas-impermeable flexible sheet configured to be positioned operatively atop the pliable blank when the pliable blank is positioned operatively atop the plurality of forming blocks, wherein the gas-impermeable flexible sheet is configured to be sealed around a perimeter of the pliable blank when the pliable blank is positioned operatively atop the plurality of forming blocks; and
a vacuum system configured to selectively evacuate air from between the gas-impermeable flexible sheet and the plurality of forming blocks when the pliable blank is positioned operatively atop of the plurality of forming blocks to conform the pliable blank to the corrugated form.

4. The tool of claim 1, wherein the block translating mechanisms include bladders positioned between each adjacent pair of forming blocks of the plurality of forming blocks, and wherein the bladders are configured to selectively deflate to cause the forming blocks to translate toward each other when the tool is reconfigured from the pre-formed configuration to the post-formed configuration.

5. The tool of claim 1, further comprising:
wherein the block translating mechanisms include mechanical linkages configured to operatively translate the forming blocks when the tool is reconfigured from the pre-formed configuration to the post-formed configuration.

6. The tool of claim 1, wherein the block translating mechanisms include a spring interconnecting each adjacent pair of forming blocks of the plurality of forming blocks, and wherein the springs are configured to selectively compress to permit the forming blocks to translate toward each other when the tool is reconfigured from the pre-formed configuration to the post-formed configuration.

7. The tool of claim 1, wherein the tool includes a control system connected to the block translating mechanisms configured to sequentially translate select forming blocks of the plurality of forming blocks in a predetermined order to reconfigure the tool from the pre-formed configuration to the post-formed configuration.

8. The tool of claim 7,
wherein the plurality of forming blocks includes a plurality of ridge forming blocks and a plurality of valley forming blocks laterally supported in an alternating arrangement; and
wherein the plurality of forming blocks also includes a central forming block, and wherein the control system is configured to sequentially translate pairs of forming blocks toward the central forming block beginning with a pair of forming blocks closest to the central forming block and ending with a pair of forming blocks furthest from the central forming block to reconfigure the tool from the pre-formed configuration to the post-formed configuration.

9. The tool of claim 1, wherein the corrugated form includes contours in three dimensions.

10. The tool of claim 1, wherein the at least one ridge forming block includes a base block and a filler structure removably engaged to an upper side of the base block, wherein the filler structure is configured to be selectively disengaged from the upper side of the base block and to remain with the corrugated structure after the tool has operatively loaded the corrugated structure onto a layup mandrel.

11. The tool of claim 10, wherein the filler structure is configured to be captured between the corrugated structure and a skin segment while the corrugated structure is operatively loaded on the layup mandrel.

12. A system for assembling a stiffened composite structure including a corrugated structure, the system comprising:
a tool for forming a corrugated structure from a pliable blank, the tool comprising:
a plurality of forming blocks laterally and movably supported relative to each other; wherein the tool defines a pre-formed configuration and a post-formed configuration; wherein when the tool is in the pre-formed configuration, the forming blocks are spaced laterally further away from each other than when the tool is in the post-formed configuration; wherein when the tool is in the post-formed configuration, the plurality of forming blocks collectively defines a corrugated form; and wherein the plurality of forming blocks includes:
at least one ridge forming block having an upper surface configured to at least partially define a respective ridge of the corrugated structure; and
at least two valley forming blocks separate from the at least one ridge forming block positioned on opposite lateral sides of the at least one ridge forming block, wherein each valley forming block has an upper surface that is lower than the upper surface of the at least one ridge forming block and that is configured to at least partially define a respective valley of the corrugated structure;
a compaction mechanism configured to selectively conform the pliable blank to the corrugated form; and
block translating mechanisms positioned between each of the at least two valley forming blocks and the at least one ridge forming block configured to reconfigure the tool from the pre-formed configuration to the post-formed configuration by selectively translating the at least two valley forming blocks laterally relative to and toward the at least one ridge forming block while the compaction mechanism operatively conforms the pliable blank to the corrugated form;
a supply of pliable blanks for forming a plurality of corrugated structures with the tool;
a layup mandrel for receiving a corrugated structure of the plurality of corrugated structures; and
a supply of skin segments for loading onto the layup mandrel over one or more loaded corrugated structures.

13. The system of claim 12, further comprising:
a supply of filler structures;

wherein the at least one ridge forming block includes a base block and a filler structure from the supply of filler structures removably engaged to an upper side of the base block, wherein the filler structure is configured to be selectively disengaged from the upper side of the base block and to remain with the corrugated structure after the tool has operatively loaded the corrugated structure onto the layup mandrel.

14. The system of claim 12, wherein the pliable blanks and the skin segments are constructed of pre-preg composite plies.

15. A method of forming a corrugated structure, the method comprising:
providing a tool comprising:
a plurality of forming blocks laterally and movably supported relative to each other; wherein the tool defines a pre-formed configuration and a post-formed configuration; wherein when the tool is in the pre-formed configuration, the forming blocks are spaced laterally further away from each other than when the tool is in the post-formed configuration; wherein when the tool is in the post-formed configuration, the plurality of forming blocks collectively defines a corrugated form; and wherein the plurality of forming blocks includes:
at least one ridge forming block having an upper surface configured to at least partially define a respective ridge of the corrugated structure; and
at least two valley forming blocks separate from the at least one ridge forming block positioned on opposite lateral sides of the at least one ridge forming block, wherein each valley forming block has an upper surface that is lower than the upper surface of the at least one ridge forming block and that is configured to at least partially define a respective valley of the corrugated structure;
a compaction mechanism configured to selectively conform a pliable blank to the corrugated form; and
block translating mechanisms positioned between each of the at least two valley forming blocks and the at least one ridge forming block configured to reconfigure the tool from the pre-formed configuration to the post-formed configuration by selectively translating the at least two valley forming blocks laterally relative to and toward the at least one ridge forming block while the compaction mechanism operatively conforms the pliable blank to the corrugated form;
positioning the pliable blank operatively atop the plurality of forming blocks in the pre-formed configuration;
following the positioning, selectively translating the at least two valley forming blocks toward the at least one ridge forming block using the block translating mechanisms to reconfigure the tool to the post-formed configuration; and
concurrently with the translating, selectively conforming the pliable blank to the corrugated form using the compaction mechanism to form the corrugated structure.

16. The method of claim 15, wherein the plurality of forming blocks includes a central ridge forming block, and wherein the translating includes sequentially translating pairs of valley forming blocks beginning with a pair of valley forming blocks closest to the central ridge forming block and ending with a pair of forming blocks furthest from the central ridge forming block to reconfigure the tool from the pre-formed configuration to the post-formed configuration.

17. A tool for forming a corrugated structure from a pliable blank, the tool comprising:
a plurality of forming blocks laterally movably supported relative to each other and including a central forming block; wherein the tool defines a pre-formed configuration and a post-formed configuration; wherein when the tool is in the pre-formed configuration, the forming blocks are spaced laterally further away from each other than when the tool is in the post-formed configuration; wherein when the tool is in the post-formed configuration, the plurality of forming blocks collectively defines a corrugated form; and wherein the plurality of forming blocks includes:
a plurality of ridge forming blocks, each having an upper surface configured to at least partially define a respective ridge of the corrugated structure; and
a plurality of valley forming blocks separate from the plurality of ridge forming blocks laterally supported in an alternating arrangement with the plurality of ridge forming blocks, each valley forming block having an upper surface that is lower than the upper surfaces of the ridge forming blocks and that is configured to at least partially define a respective valley of the corrugated structure;
a vacuum compaction mechanism configured to selectively conform a pliable blank to the corrugated form, wherein the vacuum compaction mechanism includes:
a gas-impermeable flexible sheet configured to be positioned atop the pliable blank when the pliable blank is positioned atop the plurality of forming blocks, wherein the gas-impermeable flexible sheet is configured to be sealed around a perimeter of the pliable blank when the pliable blank is positioned atop the plurality of forming blocks; and
a vacuum system configured to selectively evacuate air from between the gas-impermeable flexible sheet and the plurality of forming blocks when the pliable blank is positioned atop of the plurality of forming blocks to conform the pliable blank to the corrugated form; and
block translating mechanisms positioned between each of the plurality of forming blocks configured to reconfigure the tool from the pre-formed configuration to the post-formed configuration by selectively translating the plurality of forming blocks laterally toward each other while the vacuum compaction mechanism operatively conforms the pliable blank to the corrugated form, wherein the block translating mechanisms include:
bladders positioned between each adjacent pair of forming blocks of the plurality of forming blocks, and wherein the bladders are selectively configured to deflate to cause the forming blocks to translate toward each other when the tool is reconfigured from the pre-formed configuration to the post-formed configuration; and
a control system connected to the block translating mechanisms configured to sequentially translate pairs of forming blocks toward the central forming block beginning with a pair of forming blocks closest to the central forming block and ending with a pair of forming blocks furthest from the central forming block to reconfigure the tool from the pre-formed configuration to the post-formed configuration.

18. The tool of claim 17, wherein each ridge forming block includes a base block and a filler structure removably engaged to an upper side of the base block, wherein the filler structure is configured to be selectively disengaged from the upper side of the base block and to remain with the corrugated structure after the tool has operatively loaded the corrugated structure onto a layup mandrel.

* * * * *